(12) United States Patent
  Inakura

(10) Patent No.: US 11,710,602 B2
(45) Date of Patent: Jul. 25, 2023

(54) FILM CAPACITOR, FILM-CAPACITOR FILM, AND METHOD FOR MANUFACTURING FILM-CAPACITOR FILM

(71) Applicant: Murata Manufacturing Co., Ltd., Nagaokakyo (JP)

(72) Inventor: Tomoki Inakura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/174,438

(22) Filed: Feb. 12, 2021

(65) Prior Publication Data

US 2021/0166884 A1 Jun. 3, 2021

Related U.S. Application Data

(63) Continuation of application No. PCT/JP2019/013601, filed on Mar. 28, 2019.

(30) Foreign Application Priority Data

Aug. 20, 2018 (JP) .................. 2018-154002

(51) Int. Cl.
  *H01G 4/32* (2006.01)
  *H01G 4/015* (2006.01)
  *H01G 4/20* (2006.01)
  *H01G 4/18* (2006.01)

(52) U.S. Cl.
  CPC ............... *H01G 4/32* (2013.01); *H01G 4/015* (2013.01); *H01G 4/18* (2013.01); *H01G 4/206* (2013.01)

(58) Field of Classification Search
  CPC ........... H01G 4/32; H01G 4/015; H01G 4/206
  See application file for complete search history.

(56) References Cited

U.S. PATENT DOCUMENTS

| 6,989,350 B2 | 1/2006 | Hirota et al. |
| 2005/0090394 A1 | 4/2005 | Hirota et al. |
| 2007/0175579 A1 | 8/2007 | Otani et al. |

FOREIGN PATENT DOCUMENTS

| CN | 101483080 A | 7/2009 |
| CN | 106574061 A | 4/2017 |
| EP | 0421040 A1 * | 4/1991 |
| JP | S63316419 A | 12/1988 |
| JP | H01176556 A | 7/1989 |
| JP | H03197136 A | 8/1991 |
| JP | 2004122756 A | 4/2004 |
| JP | 2015029005 A | 2/2015 |

(Continued)

OTHER PUBLICATIONS

International Search Report Issued for PCT/JP2019/013601, dated Jun. 11, 2019.

(Continued)

*Primary Examiner* — Eric W Thomas
(74) *Attorney, Agent, or Firm* — ArentFox Schiff LLP

(57) ABSTRACT

A film capacitor that includes a resin layer which has a first surface and a second surface and in which there are particles on at least one of the first surface and the second surface; and a metal layer on the first surface of the resin layer, wherein there are more particles in number on the at least one of the first surface and the second surface of the resin layer than inside the resin layer.

10 Claims, 4 Drawing Sheets

(56) References Cited

FOREIGN PATENT DOCUMENTS

| | | |
|---|---|---|
| JP | 2015103700 A | 6/2015 |
| WO | 2013069485 A1 | 5/2013 |
| WO | 2016043217 A1 | 3/2016 |

OTHER PUBLICATIONS

Written Opinion of the International Searching Authority issued for PCT/JP2019/013601, dated Jun. 11, 2019.
Japanese Office Action issued for Japanese Application No. 2020-538025, dated Feb. 15, 2022.
Chinese Office Action issued for Chinese Application No. 201980051957.X, date of Chinese Office Action dated Nov. 2, 2021.

\* cited by examiner

FILM CAPACITOR, FILM-CAPACITOR FILM, AND METHOD FOR MANUFACTURING FILM-CAPACITOR FILM

CROSS REFERENCE TO RELATED APPLICATIONS

The present application is a continuation of International application No. PCT/JP2019/013601, filed Mar. 28, 2019, which claims priority to Japanese Patent Application No. 2018-154002, filed Aug. 20, 2018, the entire contents of each of which are incorporated herein by reference.

FIELD OF THE INVENTION

The present invention relates to a film capacitor, a film-capacitor film, and a method for manufacturing a film-capacitor film.

BACKGROUND OF THE INVENTION

A film capacitor having a structure in which a flexible resin film is used as a dielectric and a first counter electrode and a second counter electrode are arranged opposite to each other with the resin film interposed therebetween is one type of film capacitor. Such a film capacitor is produced by, for example, rolling a resin film provided with the first counter electrode and a resin film provided with the second counter electrode (refer to, for example, Patent Document 1).

Patent Document 1: International Publication No. 2013/069485

SUMMARY OF THE INVENTION

A self-healing function of a film capacitor is performed by a fuse portion in the film capacitor being cut due to an occurrence of short circuit. If the adhesiveness between the films of the fuse portion is excessively high, since a vapor-deposition electrode is not readily scattered, the fuse portion based on a short current during dielectric breakdown may not operate and the self-healing function may not be sufficiently performed. In this regard, a capacitor with high safety can be provided by highly roughening the surfaces of the films so as to reduce adhesiveness between the films.

Meanwhile, if the surface of the film is smooth, since the friction coefficient increases (slipperiness of the film is poor), the handleability of the film is poor, and degradation in the operability of the film is caused during transportation, taking up, and the like, of the film.

To provide slipperiness to the film, a technique to provide unevenness to the film surface by attaching particles to the film is performed. According to this technique, the slipperiness of the film is improved, but there is a problem of a reduction in dielectric breakdown voltage since particles serving as impurities are contained inside the film.

In accordance with such circumstances, the compatibility between an improvement in the slipperiness of a film-capacitor film and a high dielectric breakdown voltage has been desired.

The present invention was realized to address the above-described problems, and it is an object to provide a film capacitor including a film-capacitor film having high slipperiness and a high dielectric breakdown voltage. In addition, it is an object to provide a film-capacitor film for producing the film capacitor and to provide a method for manufacturing the film-capacitor film.

A film capacitor according to the present invention includes a resin layer which has a first surface and a second surface and in which there are particles on at least one of the first surface and the second surface; and a metal layer on the first surface of the resin layer, wherein there are more particles in number on the at least one of the first surface and the second surface of the resin layer than inside the resin layer.

A film-capacitor film according to the present invention includes a resin layer which has a first surface and a second surface and in which there are particles on at least one of the first surface and the second surface, and wherein there are more particles in number on the at least one of the first surface and the second surface of the resin layer than inside the resin layer.

A method for manufacturing a film-capacitor film according to the present invention includes attaching particles to a resin-solution-coating surface of a base material film; forming a resin layer by coating the resin-solution-coating surface of the base material film with a resin solution; and transferring the particles from the resin-solution-coating surface of the base material film to a surface of the resin layer by peeling the resin layer off the base material film.

According to the present invention, a film capacitor including a film-capacitor film having high slipperiness and a high dielectric breakdown voltage can be provided.

DETAILED DESCRIPTION OF THE PREFERRED EMBODIMENTS

A film capacitor, a film-capacitor film for producing the film capacitor, and a method for manufacturing the film-capacitor film according to the present invention will be described below. However, The present invention is not limited to the following configurations and the configurations can be appropriately modified and applied within the bounds of not changing the spirit of the present invention. A combination of at least two independent desirable configurations of the present invention described below are also included in the present invention.

[Film Capacitor]

A roll-type film capacitor will be described as an embodiment of the film capacitor according to the present invention.

Figure 1:
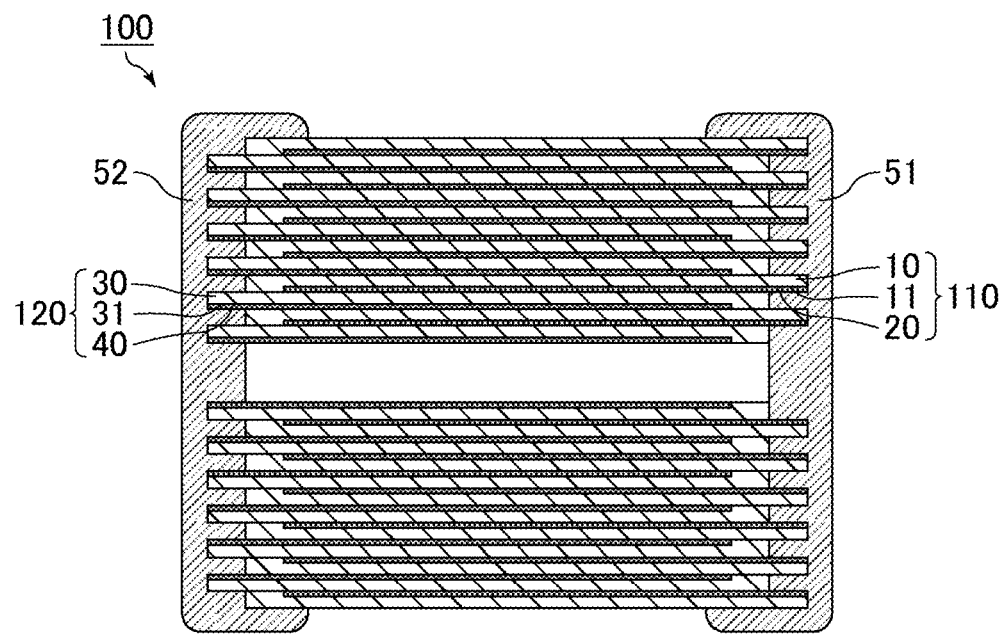
FIG. 1 is a schematic sectional view illustrating an example of a film capacitor according to the present invention.

FIG. 1 is a schematic sectional view illustrating an example of a film capacitor according to the present invention. The film capacitor 100 illustrated in FIG. 1 is a roll-type film capacitor and is constructed by rolling a metallized film 110 provided with a metal layer 20 disposed on the first surface 11 of a resin layer 10 and a metallized film 120 provided with a metal layer 40 disposed on the first surface 31 of a resin layer 30. In addition, an outer terminal electrode 51 electrically coupled to the metal layer 20 and an outer terminal electrode 52 electrically coupled to the metal layer 40 are provided. In this regard, particles present on the surface of the resin layer are omitted from FIG. 1.

The metal layer 20 is formed so as to reach one side edge of the metallized film 110 but not to reach the other side edge. Meanwhile, the metal layer 40 is formed so as not to reach one side edge of the metallized film 120 but to reach the other side edge. The metal layer 20 and the metal layer 40 are composed of, for example, aluminum, zinc, or the like.

The metallized film 110 and the metallized film 120 take on a stacked state by being rolled. As illustrated in FIG. 1, the metallized film 110 and the metallized film 120 are shifted from each other in the width direction so that both the end portion which reaches the side edge of the metallized film 110 of the metal layer 20 and the end portion which reaches the side edge of the metallized film 120 of the metal layer 40 are exposed.

In the film capacitor 100 illustrated in FIG. 1, rolling is performed so that the metallized film 110 is located outside the metallized film 120 and so that each of the metal layer 20 and the metal layer 40 of the metallized film 110 and the metallized film 120, respectively, faces inward.

The outer terminal electrode 51 and the outer terminal electrode 52 are formed on the respective end surfaces of the thus obtained capacitor main body by, for example, thermally spraying zinc or the like. The outer terminal electrode 51 is in contact with the exposed end portion of the metal layer 20 so as to be electrically coupled to the metal layer 20. Meanwhile, the outer terminal electrode 52 is in contact with the exposed end portion of the metal layer 40 so as to be electrically coupled to the metal layer 40.

Preferably, the film capacitor according to the present invention is made compact by being pressed into a flat shape having a cross-sectional shape like an ellipse or an oval. In this regard, the film capacitor according to the present invention may include a circular-columnar roll shaft. The roll shaft is disposed on a center axis line of the metallized film in a rolled state and serves as a roll shaft when the metallized film is rolled.

In production of the film capacitor, the film-capacitor film according to the present invention can be used as a film-capacitor film including a resin layer. In this regard, the film-capacitor film according to the present invention may be used as the film-capacitor film for constituting both the metallized film 110 and the metallized film 120 or the film-capacitor film according to the present invention may be used for any one of them.

[Film-Capacitor Film]

The film-capacitor film according to the present invention is a film-capacitor film including a resin layer which has a first surface and a second surface and in which there are particles on at least one of the first surface and the second surface, wherein there are more particles in number on the surface of the resin layer than inside the resin layer.

Figure 2:
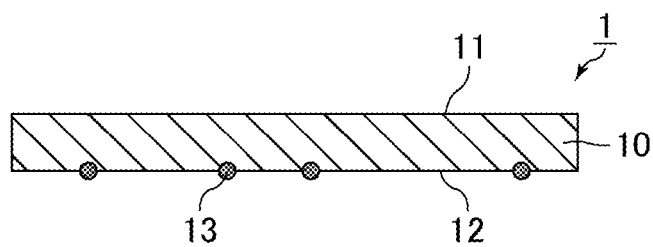
FIG. 2 is a schematic sectional view illustrating an example of a film-capacitor film according to the present invention.

FIG. 2 is a schematic sectional view illustrating an example of the film-capacitor film according to the present invention. The film-capacitor film 1 is a dielectric resin film in which there are particles 13 on the second surface 12 of the resin layer 10. In the film-capacitor film 1, there is no particle on the first surface 11 of the resin layer 10. Meanwhile, there is no particle 13 inside the resin layer 10.

In the film-capacitor film according to the present invention, there are particles on the surface of the resin layer. Particles being present on the surface of the resin layer provides the film surface with unevenness so that the friction coefficient of the film is reduced and the slipperiness of the film is improved. In this regard, particles for improving the slipperiness have to be present on the surface of the resin layer, and particles present inside the resin layer do not contribute to an improvement in the slipperiness. If there are particles inside the resin layer, the dielectric breakdown voltage is reduced, and, therefore the amount of the particles present inside the resin layer is to be reduced. That is, it is intended that there are more particles in number on the surface of the resin layer than inside the resin layer.

Particles present on the surface of the resin layer can be identified by observing the surface of the resin layer of the film-capacitor film by using a scanning electron microscope (SEM). Meanwhile, particles present inside the resin layer can be identified by increasing the acceleration voltage during observation of the surface of the resin layer of the film-capacitor film by using a scanning electron microscope (SEM). That is, a particle that is not observed at a low acceleration voltage but that is observed at an increased voltage is determined to be a particle present inside the resin layer. The observation of the surface of the resin layer by using the scanning electron microscope (SEM) is performed while changing the acceleration voltage from a low voltage to a high voltage, the number of particles present on the surface of the resin layer and the number of particles present inside the resin layer are counted, and it is determined whether the number of particles present on the surface of the resin layer is greater than the number of particles present inside the resin layer. In this regard, the number of particles present on the surface of the resin layer and the number of particles present inside the resin layer can be counted by changing the acceleration voltage within the range of 1 kV or more and 10 kV or less.

Meanwhile, it is preferable that there be no particle inside the resin layer. Since particles present inside the resin layer do not contribute to an improvement in slipperiness and, in addition, cause a reduction in the dielectric breakdown voltage, no presence is preferable.

Particles are preferably inorganic particles and more preferably silica particles. The average particle diameter of the particles is preferably 0.1 μm to 0.4 μm. The diameter of a particle present on the surface of the resin layer becomes greater in accordance with an increase in the acceleration voltage during observation of the surface of the resin layer by using the SEM (the maximum diameter of the embedded portion is observed). The area of a particle at the maximum size of the particle is converted to the equivalent circle diameter so as to determine the diameter of the particle. The average value of the diameters of particles in the field of view is taken as the average particle diameter of the particles. Herein, the average particle diameter of the particles denotes the average particle diameter of particles present on the surface of the resin layer.

In addition, it is preferable that 5 to 16 particles be present per 0.001188 mm² of the surface of the resin layer having the particles thereof. The number of the particles present on the surface of the resin layer being within the above-described range allows the effect of particles present on the surface of the resin layer to be sufficiently exerted. Meanwhile, even when the number of the particles present on the surface of the resin layer is increased beyond the above-described range, the effect of improving the slipperiness is not improved any more. The number of the particles present on the surface of the resin layer can be determined by measuring 10 fields of view (each field of view is 12.5 μm×9.5 μm, and the total of 10 fields of view is 0.001188 mm²) that are places randomly selected from the surface of the resin layer with an SEM at a magnification of 10,000 times and by counting the number of particles in the 10 fields of view observed at that time.

Meanwhile, the height of a particle protruding from the resin layer is preferably 0.005 μm to 0.1 μm. The height of a particle protruding from the surface of the resin layer being within the above-described range allows the effect of the particle present on the surface of the resin layer to be sufficiently exerted. The height of a particle protruding from the surface of the resin layer can be determined by observing the surface of the resin layer by using a scanning probe microscope (SPM) with a field of view of 2 μm×2 μm.

Preferably, the resin layer contains a resin having at least one of a urethane bond and a urea bond as a primary component. Examples of such resins include urethane resins having a urethane bond and urea resins having a urea bond. In addition, resins having both a urethane bond and a urea bond may be included. In this regard, the presence of a urethane bond and/or a urea bond can be identified by using a Fourier transform infrared spectrophotometer (FT-IR).

In the present specification, "primary component" denotes a component having a maximum proportion (% by weight) and preferably denotes a component having a proportion of more than 50% by weight. Therefore, the resin layer may contain, for example, additives such as a silicone resin and uncured portions of starting materials such as a first organic material and a second organic material, described later, as components other than the primary component.

Preferably, the resin layer contains a curable resin as a primary component. The curable resin may be a thermosetting resin or may be a photo-curable resin. In this regard, the resin layer may contain a thermoplastic resin. In the case in which the resin layer is a thermoplastic resin, a polyarylate resin and the like can be used. In the present specification, the thermosetting resin denotes a resin which can be cured by heat, and a curing method is not limited. Therefore, a resin that have cured by a method other than heat (for example, light, an electron beam, or the like) is also included in the thermosetting resin provided that the resin can be cured by heat. Meanwhile, a reaction may start due to the reactivity of just a material in accordance with the material, and the resin that is cured without the need for applying heat, light, or the like from the outside is included in the thermosetting resin. The same applies to the photo-curable resin and there is no limitation regarding the curing method.

Preferably, the curable resin is composed of the first organic material and the second organic material. Examples include cured products obtained by a reaction between a hydroxy group (OH group) included in the first organic material and an isocyanate group (NCO group) included in the second organic material.

In the case in which a cured product is obtained by the above-described reaction, uncured portions of start materials may remain in the resin layer. For example, the resin layer may contain an isocyanate group (NCO group).

In this regard, the presence of an isocyanate group can be identified by using a Fourier transform infrared spectrophotometer (FT-IR).

Preferably, the first organic material is a polyol having a plurality of hydroxy groups (OH groups) in the molecule. Example of the polyol include polyether polyols, polyester polyols, and polyvinyl acetoacetals. Regarding the first organic material, at least two types of organic materials may be used in combination. Of the first organic materials, phenoxy resins belonging to polyether polyols are preferable.

Preferably, the second organic material is an isocyanate compound, an epoxy resin having an epoxy group, or a melamine resin, which has a plurality of functional groups in the molecule. Regarding the second organic material, at least two types of organic materials may be used in combination.

Examples of the isocyanate compound include aromatic polyisocyanates such as diphenylmethane diisocyanate (MDI) and tolylene diisocyanate (TDI) and aliphatic polyisocyanates such as hexamethylene diisocyanate (HDI). Modified products of these polyisocyanates, for example, modified products containing carbodiimide, urethane, or the like may also be included. Of these, aromatic polyisocyanates are preferable, and MDI is more preferable.

There is no particular limitation regarding the epoxy resin provided that the resin has an epoxy ring, and examples of the epoxy resin include bisphenol A type epoxy resins, biphenyl-skeleton epoxy resins, cyclopentadiene-skeleton epoxy resins, and naphthalene-skeleton epoxy resins.

There is no particular limitation regarding the melamine resin provided that the resin is an organic nitrogen compound having a triazine ring at the center of the structure and having 3 amino groups around the center, and examples thereof include alkylated melamine resins. In addition, modified products of melamine may be included.

The resin layer may contain an additive for providing another function. For example, adding a leveling agent enables the smoothness to be provided. More preferably, the additive is a material having a functional group that reacts with a hydroxy group and/or an isocyanate group and that forms part of cross-linking structure of a cured product. Examples of such materials include resins having at least one functional group selected from a group consisting of an epoxy group, a silanol group, and a carboxy group.

There is no particular limitation regarding the thickness of the resin layer, and the thickness is preferably 1 μm to 5 μm. Herein, the thickness of the resin layer denotes a thickness measured at a position at which there is no particle on the surface. The thickness of the resin layer being 1 μm to 5 μm enables the number of defects such as cracks and the like generated during film formation to be reduced.

In the case in which there is no particle inside the resin layer, regarding the relationship between the thickness of the resin layer and the particle diameter of the particle, a reduction in the ratio of the particle diameter to the film thickness (particle diameter/film thickness) is preferable because of an increase in the dielectric breakdown voltage. In the case in which there is no particle inside the resin layer, the ratio of the particle diameter to the film thickness (particle diameter [μm]/film thickness [μm]) is preferably 0.04 to 0.13. Herein, the particle diameter is the average particle diameter of particles. in the case in which at least two types of particles are used, the ratio of the particle diameter to the film thickness is calculated by using the particle diameter of a larger particle.

Figure 3:
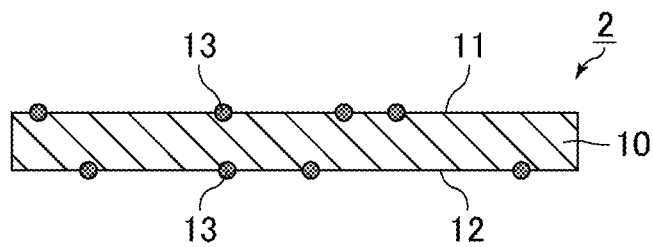
FIG. 3 is a schematic sectional view illustrating another example of the film-capacitor film according to the present invention.

FIG. 3 is a schematic sectional view illustrating another example of the film-capacitor film according to the present invention. The film-capacitor film 2 is a dielectric resin film in which there are particles 13 on the second surface 12 of the resin layer 10, and there are particles 13 on also the first surface 11 of the resin layer 10. Meanwhile, there is no particles 13 inside the resin layer 10.

Particles being present on the first surface and the second surface of the resin layer enables the slipperiness of the film to be further improved. In addition, in the film-capacitor film of this form, there are more particles in number on both the first surface and the second surface of the resin layer than inside the resin layer. Such a film-capacitor film can also exert the effect of the film-capacitor film according to the present invention.

The dielectric breakdown voltage of the film-capacitor film according to the present invention is preferably 300 V/μm or more. In the case in which the dielectric breakdown voltage of a film is measured, an aluminum thin film serving as an electrode is disposed on the first surface and the second surface of the film by using a vacuum vapor deposition device, and thereafter a voltage is applied to the film in an atmosphere at 125° C. The voltage is increased until a hole is made in the film, and the voltage at which a hole is made in the film is taken as the dielectric breakdown voltage. The dielectric breakdown voltage is measured at 16 points, and an average value thereof is determined.

Preferably, the film-capacitor film according to the present invention has a friction coefficient suitable for smooth sliding of films stacked on each other. In the case in which two films are stacked, the first surface of one film and the second surface of the other film are stacked, and the friction coefficient is measured. In the case in which there are particles on the second surface of the resin layer and there is no particle on the first surface, the second surface (surface on which particles are present) of one film and the first surface (surface on which no particle is present) of the other film are stacked. In the case in which there are particles on both the first surface and the second surface of the resin layer, the second surface (surface on which particles are present) of one film and the first surface (surface on which particles are present) of the other film are stacked. The measurement of the friction coefficient is performed in conformity with JIS K 7125, and the friction coefficient is preferably 1.0 or less so as to be suitable for smooth sliding of films stacked on each other. Regarding the friction coefficient, either a static friction coefficient or a dynamic friction coefficient may be used.

It is preferable that the film-capacitor films illustrated in FIG. 2 and FIG. 3 be made into a metallized film by the first surface of the resin layer being provided with the metal layer and be used for producing a film capacitor, as described later. The metal layer may be disposed on the surface on which particles are present or may be disposed on the surface on which no particle is present.

Figure 4A:
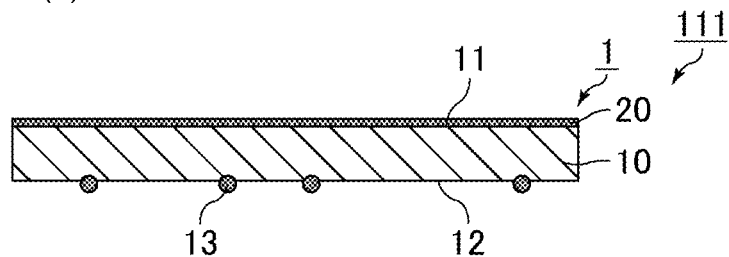
FIG. 4(a) and FIG. 4(b) are schematic sectional views illustrating examples of a metallized film in which a metal layer is disposed on a film-capacitor film according to the present invention.
Figure 4B:
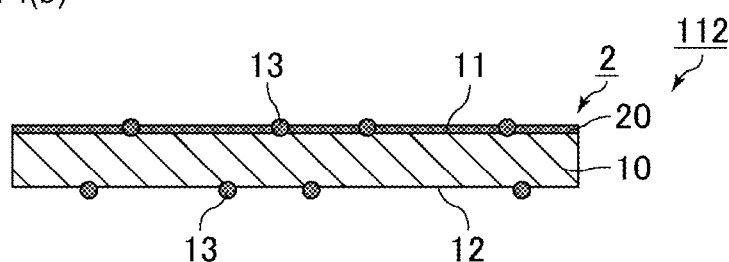

The film-capacitor film according to the present invention can be made into a metallized film by providing a metal layer on the first surface of the resin layer. FIG. 4(a) and FIG. 4(b) are schematic sectional views illustrating examples of a metallized film in which a metal layer is disposed on the film-capacitor film according to the present invention. In the metallized film 111 illustrated in FIG. 4(a), a metal layer 20 is disposed on the first surface 11 of the resin layer 10, and there are particles 13 on the second surface 12 of the resin layer 10. That is, in the resin layer, the metal layer is disposed on the surface on which there is no particle.

In the metallized film 112 illustrated in FIG. 4(b), a metal layer 20 is disposed on the first surface 11 of the resin layer 10, and there are particles 13 on the second surface 12 of the resin layer 10, and, in addition, there are particles 13 on also the first surface 11 of the resin layer 10. That is, in the resin layer, the metal layer is disposed on the surface on which there are particles.

In this case, at least some of the surfaces of the particles 13 present on the first surface 11 of the resin layer 10 may be exposed at the metal layer 20. Regarding the metallized film, in the case in which the metal layer is disposed on the surface on which there are particles in the resin layer, since at least some of the surfaces of the particles being exposed at the metal layer increase the degree of unevenness of the film surface, the effect of improving the slipperiness is further favorably exerted. In this regard, the entire surfaces of the particles may be covered with the metal layer. In the case in which the entire surfaces of the particles are covered with the metal layer, it is conjectured that the effect of improving the slipperiness is somewhat reduced since the unevenness of the film surface formed by particles is lessened. However, the effect of improving the slipperiness is exerted even when the entire surfaces of the particles are covered with the metal layer.

Regarding the metallized film, the number of the particles exposed at the metal layer can be determined by measuring 10 fields of view (each field of view is 12.5 μm×9.5 μm, and the total of 10 fields of view is 0.001188 mm$^2$) that are places randomly selected from the surface of the metallized film with an SEM at a magnification of 10,000 times and by counting the number of particles in the 10 fields of view observed at that time.

Examples of the metal layer include aluminum, zinc, and the like. The material constituting the metal layer being aluminum or zinc facilitates maintenance of favorable bondability to an outer terminal electrode.

The thickness of the metal layer is preferably 5 nm or more and 50 nm or less. Preferably, the thickness of the metal layer is determined in consideration of the resistance value of the metal layer. Preferably, the thickness of the metal layer is determined so that the surface resistance of the metal layer becomes 20 Ω/cm$^2$ or less. If the thickness of the metal layer is excessively small, the conduction of the metal layer portion may become open.

Preferably, the metal layer is provided with a fuse portion. The fuse portion denotes a portion of the metal layer serving as a counter electrode, the portion connecting electrode portions divided into a plurality of parts to each other. There is no particular limitation regarding the pattern of the metal layer having the fuse portion. For example, electrode patterns disclosed in Japanese Unexamined Patent Application Publication No. 2004-363431, Japanese Unexamined Patent Application Publication No. 5-251266, and the like may be used.

Next, a method for manufacturing the film-capacitor film according to the present invention will be described. The method for manufacturing the film-capacitor film according to the present invention includes forming a resin layer by coating a base material film with a resin solution. Regarding the base material film, a film in which particles are attached to a resin-solution-coating surface is used. When the base material film is coated with the resin solution, the particles that have been attached to the base material film are attached to the applied resin solution. Subsequently, the particles are transferred from the base material film to the surface of the resin layer by peeling the resin layer off the base material film.

Figure 5A:
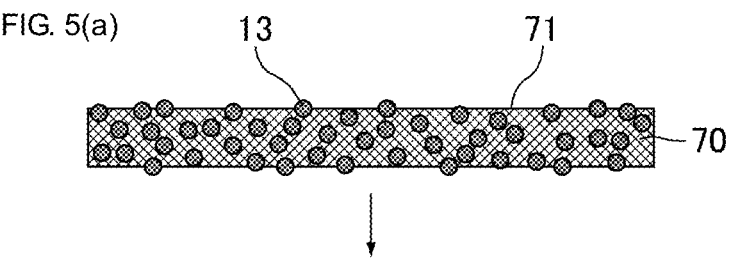
FIG. 5(a), FIG. 5(b), and FIG. 5(c) are schematic step diagrams illustrating an example of a method for manufacturing a film-capacitor film according to the present invention.
Figure 5B:
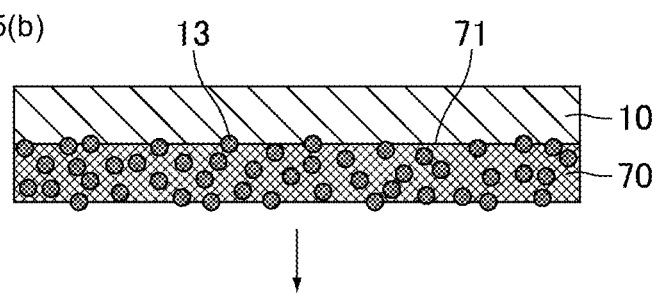
Figure 5C:
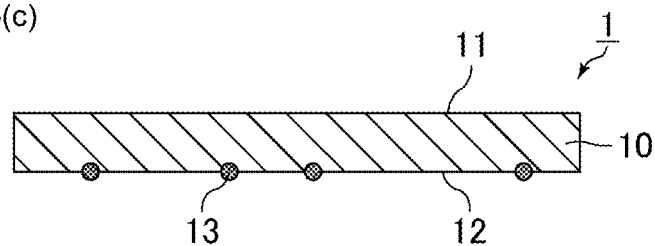

FIG. 5(a), FIG. 5(b), and FIG. 5(c) are schematic step diagrams illustrating an example of a method for manufacturing the film-capacitor film according to the present invention. Initially, as illustrated in FIG. 5(a), a base material film 70 is prepared. The base material film 70 is a film including particles 13 in the inside and on the surface, and particles 13 are attached to a resin-solution-coating surface 71.

As illustrated in FIG. 5(b), the resin-solution-coating surface 71 of the base material film 70 is coated with the resin solution, and after the resin solution is applied, the resin is subjected to curing treatment, drying treatment, and the like, as the situation demands, so as to form the resin layer 10. Subsequently, as illustrated in FIG. 5(c), the particles 13 are transferred from the base material film 70 to the second surface 12 of the resin layer 10 by peeling the resin layer 10 off the base material film 70. In this manner, the film-capacitor film 1 is obtained.

Preferably, the base material film is a polypropylene film. Regarding the base material film, it is preferable that particles be kneaded into the film, and particles be attached to the film surface.

Regarding the resin solution used for forming the film-capacitor film, a resin solution in which a resin serving as a raw material or a precursor of the resin is dispersed in a solvent can be used. In this regard, the solvent (methyl ethyl ketone, tetrahydrofuran, ethyl acetate, or the like) contained in the resin solution may be present as a residue in the resin layer.

Figure 6:
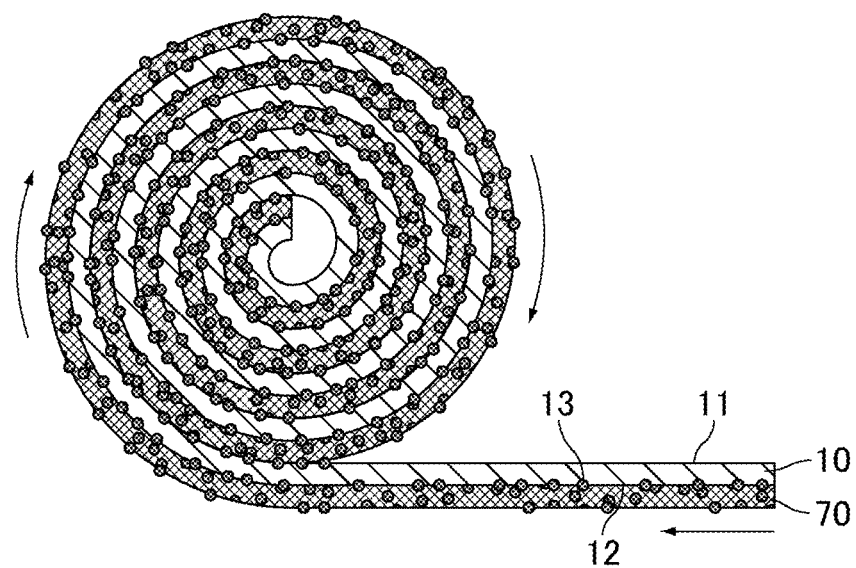
FIG. 6 is a schematic step diagram illustrating an example of the state of rolling a film after coating.

Next, production of the film-capacitor film in which there are particles on the first surface and the second surface of the resin layer will be described. In the case in which particles are made to be present on the first surface and the second surface of the resin layer, the film-capacitor film is obtained through the step of applying a resin solution to a resin-solution-coating surface of a base material film in which particles are attached to both surfaces and the step of rolling the film after coating. FIG. 6 is a schematic step diagram illustrating an example of the state of rolling the film after coating. FIG. 6 illustrates the state of rolling the film after coating where the resin layer 10 is formed by coating the base material film 70 with a resin solution. The rolling direction is indicated by arrows in FIG. 6. As illustrated in FIG. 6, when the film after coating is rolled, the first surface 11 of the resin layer 10 comes into contact with the adjacent base material film 70. Since particles 13 are attached to both surfaces of the base material film 70, particles 13 are also attached to the first surface 11 of the resin layer 10 by rolling the film after coating.

Thereafter, the rolled film after coating is spread by being rotated in the direction opposite to the rolling direction so that particles 13 are transferred to the first surface 11 of the resin layer 10. Subsequently, the resin layer 10 is peeled off the base material film 70 so as to transfer the particles 13 to the second surface 12 of the resin layer 10. In this manner, the film-capacitor film in which there are particles on the first surface and the second surface of the resin layer (the film-capacitor film 2 illustrated in FIG. 3) is obtained.

[Method for Manufacturing Film Capacitor]

Next, a method for manufacturing a film capacitor according to the present invention will be described. Initially, a metallized film is obtained by disposing a metal layer on the first surface of the resin layer of the film-capacitor film according to the present invention. Examples of the method for disposing the metal layer on the first surface of the resin layer of the film-capacitor film include a vapor deposition method.

As illustrated in FIG. 5(b), the resin layer 10 is formed on the base material film 70. In this state, a metal layer 20 can be disposed on the resin layer 10 by subjecting the surface of the resin layer 10 opposite to the base material film 70 to vapor deposition or the like. The surface provided with the metal layer as described above serves as the first surface of the resin layer, and the base-material-film-side surface to which particles are attached serves as the second surface. The metallized film obtained by peeling the base material film after the above-described step is a metallized film 111 illustrated in FIG. 4(a).

Meanwhile, in the state after the rolled film after coating is produced, as illustrated in FIG. 6, and is spread by being rotated in the direction opposite to the rolling direction, the resin layer 10 is formed on the base material film 70, and particles 13 are attached to the surface of the resin layer 10 opposite to the base material film 70. Subsequently, the metal layer 20 can be disposed on the surface of the resin layer 10 to which particles 13 are attached by subjecting the surface of the resin layer 10 opposite to the base material film 70 to vapor deposition or the like. The surface provided with the metal layer as described above serves as the first surface of the resin layer, and the base-material-film-side surface to which particles are attached serves as the second surface of the resin layer. The metallized film obtained by peeling the base material film after the above-described step is a metallized film 112 illustrated in FIG. 4(b). In this step, preferably, the thickness of the metal layer is adjusted so that the surface resistance of the metal layer becomes 20 $\Omega/cm^2$ or less. At this time, at least some of the surfaces of the particles may be exposed at the metal layer.

Meanwhile, the metal layer may be formed on the resin layer after the resin layer is peeled off the base material film.

A multilayer body is obtained by stacking two such metallized films in the state of being shifted a predetermined distance from each other in the width direction and by performing rolling. As the situation demands, the multilayer body may be sandwiched in the direction perpendicular to the width direction and may be pressed into the shape of an elliptical cylinder. Subsequently, an outer terminal electrode is formed on the end surface of the multilayer body so as to obtain a film capacitor as illustrated in FIG. 1. Examples of the method for forming the outer terminal electrode on the end surface of the multilayer body include thermal spraying.

EXAMPLES

Examples in which the film capacitor and the film-capacitor film according to the present invention are further specifically disclosed will be described. In this regard, the present invention is not limited to just these examples.

Example 1

[Production of Film-Capacitor Film]

A resin solution was prepared by dissolving a phenoxy resin and a modified product of diphenylmethane diisocyanate (MDI) into an organic solvent and further adding a silicone-containing surface additive BYK-370 (produced by BYK Japan KK). The resulting resin solution was applied to a polypropylene film (TORAYFAN: produced by Toray Industries, Ltd., thickness of 12 μm) in which silica particles having an average particle diameter of 0.1 μm (particle diameter distribution of 0.04 μm to 0.3 μm) and silica particles having an average particle diameter of 0.4 μm (particle diameter distribution of 0.2 μm to 0.6 μm) were attached to the surface, the solvent was dried, and the film after coating was rolled as illustrated in FIG. 6. Thereafter, the rolled film after coating was spread by being rotated in the direction opposite to the rolling direction. Subsequently, heating was performed so as to subject the phenoxy resin and the MDI modified product to a heat reaction. Further, a film (film-capacitor film) having a thickness of about 3.0 μm was produced by being peeled off the polypropylene film. Silica particles were partly buried under the second surface (polypropylene-film-side surface) and the first surface (surface opposite to the polypropylene film) of the resulting film. The number of particles on the second-surface-side film surface, the dielectric breakdown voltage of the film, and the friction coefficient between the films were measured. The results are described in Table 1.

The number of the particles on the film surface was determined by measuring 10 fields of view (each field of view was 12.5 μm×9.5 μm, and the total of 10 fields of view was 0.001188 mm$^2$) that were places randomly selected from the second-surface-side surface of the resin layer (film-capacitor film) with an SEM at a magnification of 10,000 times and by counting the number of particles in the 10 fields of view observed at that time. The dielectric breakdown voltage of the film was measured by disposing an aluminum thin film serving as an electrode on the first surface and the second surface of the film by using a vacuum vapor deposition device and thereafter applying a voltage to the film in an atmosphere at 125° C. The voltage was increased until a hole was made in the film, and the voltage at which a hole was made in the film was taken as the dielectric breakdown voltage. The dielectric breakdown voltage of the film was measured at 16 points, and an average value thereof was determined. The measurement of the friction coefficient was performed in conformity with JIS K 7125, and the dynamic friction coefficient and the static friction coefficient were determined. The friction coefficient was measured while the second surface (polypropylene-film-side surface) and the first surface (surface opposite to the second surface) of the resulting film were stacked.

Example 2

A film (film-capacitor film) having a thickness of about 2.3 μm was produced in the same manner as in Example 1 except that the amount of the resin solution applied was changed. Silica particles were partly buried under the second surface and the first surface of the resulting film. The number of particles on the film surface, the dielectric breakdown voltage of the film, and the friction coefficient between the films were measured. The results are described in Table 1.

Example 3

A film (film-capacitor film) having a thickness of about 2.3 μm was produced in the same manner as in Example 1 except that a polypropylene film (TORAYFAN: produced by Toray Industries, Ltd., thickness of 12 μm) in which silica particles having an average particle diameter of 0.1 μm (particle diameter distribution of 0.04 μm to 0.3 μm) were attached to the surface was used as the film to be coated with the resin solution. Silica particles were partly buried under the second surface and the first surface of the resulting film. The number of particles on the film surface, the dielectric breakdown voltage of the film, and the friction coefficient between the films were measured. The results are described in Table 1.

Example 4

A film (film-capacitor film) having a thickness of about 1.0 μm was produced in the same manner as in Example 3 except that the amount of the resin solution applied was changed. Silica particles were partly buried under the second surface and the first surface of the resulting film. The number of particles on the film surface, the dielectric breakdown voltage of the film, and the friction coefficient between the films were measured. The results are described in Table 1.

Example 5

A resin solution was prepared by dissolving a thermoplastic polyarylate (UNIFINER produced by UNITIKA LTD.) into an organic solvent. The resulting resin solution was applied to a polypropylene film (TORAYFAN: produced by Toray Industries, Ltd., thickness of 12 μm) in which silica particles having an average particle diameter of 0.1 μm (particle diameter distribution of 0.04 μm to 0.3 μm) and silica particles having an average particle diameter of 0.4 μm (particle diameter distribution of 0.2 μm to 0.6 μm) were attached to the surface, the solvent was dried, and the film after coating was rolled as illustrated in FIG. 6. Thereafter, the rolled film after coating was spread by being rotated in the direction opposite to the rolling direction and was peeled off the polypropylene film so as to produce a film (film-capacitor film) having a thickness of about 3.0 μm. Silica particles were partly buried under the second surface (polypropylene-film-side surface) and the first surface (surface opposite to the polypropylene film) of the resulting film. The number of particles on the second-surface-side film surface, the dielectric breakdown voltage of the film, and the friction coefficient between the films were measured. The results are described in Table 1.

Comparative Example 1

Silica particles having an average particle diameter of 0.2 μm and a silane coupling agent were placed into a solvent in which toluene and ethanol was mixed at a weight ratio of 1:1, and agitation was performed for 8 hours in a ball mill so as to produce a silica particle dispersion liquid in which silica particles surface-treated with the silane coupling agent were dispersed. According to measurement of the particle diameter distribution of particles in the resulting silica particle dispersion liquid, the average particle diameter was 0.4 μm. A phenoxy resin and an MDI modified product were dissolved into an organic solvent and were mixed, and a silicone-containing surface additive BYK-370 (produced by BYK Japan KK) was further added. Thereafter, the resin solution was prepared by adding the silica particle dispersion liquid produced as described above so that the ratio of the particles relative to a solid content weight of the phenoxy resin and the MDI modified product became 1% by weight. The resulting resin solution was applied to a smooth PET film provided with a mold-release layer on the surface, and the solvent was dried. After the phenoxy resin and the MDI modified product were subjected to a heat reaction, a film (film-capacitor film) having a thickness of about 3.0 μm was produced by being peeled off the PET film. The number of particles on the film surface, the dielectric breakdown voltage of the film, and the friction coefficient between the films were measured. The results are described in Table 1.

Comparative Example 2

A phenoxy resin and an MDI modified product were dissolved into an organic solvent and were mixed, and a surface additive was further added. Thereafter, the resin solution was prepared by adding a dispersion liquid of silica having a particle diameter of 0.01 to 0.015 μm (ORGANO-SILICASOL MEK-ST produced by Nissan Chemical Industries, Ltd.) so that the ratio of the particles relative to a solid content weight of the phenoxy resin and the MDI modified product became 1% by weight. The resulting resin solution was applied to a smooth PET film provided with a mold-release layer on the surface, and the solvent was dried. After the phenoxy resin and the MDI modified product were subjected to a heat reaction, a film (film-capacitor film) having a thickness of about 3.0 μm was produced by being peeled off the PET film. The number of particles on the film surface, the dielectric breakdown voltage of the film, and the friction coefficient between the films were measured. The results are described in Table 1.

Comparative Example 3

A resin solution was prepared by dissolving the thermoplastic polyarylate (UNIFINER produced by UNITIKA LTD.) into an organic solvent and adding the silica particle dispersion liquid produced in the same manner as in Comparative example 1 so that the ratio of the particles relative to a solid content weight of the polyarylate became 1% by weight. The resulting resin solution was applied to a smooth PET film provided with a mold-release layer on the surface. After the solvent was dried, a film (film-capacitor film) having a thickness of about 3.0 μm was produced by being peeled off the PET film. The number of particles on the film surface, the dielectric breakdown voltage of the film, and the friction coefficient between the films were measured. The results are described in Table 1.

TABLE 1

| | Film thickness [μm] | Particle diameter [μm] | Particle diameter/film thickness (*1) | Number of surface particles (*2) | Presence of internal particle | Dielectric breakdown voltage [V/μm] |
|---|---|---|---|---|---|---|
| Example 1 | 3.0 | 0.1 + 0.4 | 0.13 | 12 | none | 373 |
| Example 2 | 2.3 | 0.1 + 0.4 | 0.17 | 10 | none | 310 |
| Example 3 | 2.3 | 0.1 | 0.04 | 9 | none | 360 |
| Example 4 | 1.0 | 0.1 | 0.10 | 10 | none | 340 |
| Example 5 | 3.0 | 0.1 + 0.4 | 0.13 | 10 | none | 380 |
| Comparative example 1 | 3.0 | 0.4 | 0.13 | 16 | yes | 209 |
| Comparative example 2 | 3.0 | 0.015 | 0.005 | 0 | yes | 383 |
| Comparative example 3 | 3.0 | 0.4 | 0.13 | 15 | yes | 255 |

| | Static friction coefficient | Dielectric breakdown voltage | Evaluation of dielectric breakdown voltage | Evaluation of friction coefficient | Overall evaluation |
|---|---|---|---|---|---|
| Example 1 | 0.47 | 0.46 | ○ | ○ | ○ |
| Example 2 | 0.67 | 0.65 | ○ | ○ | ○ |
| Example 3 | 0.97 | 0.96 | ○ | ○ | ○ |
| Example 4 | 1 | 0.98 | ○ | ○ | ○ |
| Example 5 | 0.55 | 0.51 | ○ | ○ | ○ |
| Comparative example 1 | 0.43 | 0.42 | x | ○ | x |
| Comparative example 2 | measurement was impossible | measurement was impossible | ○ | x | x |
| Comparative example 3 | 0.6 | 0.58 | x | ○ | x |

(*1) In the case in which two types of particles are used, the particle diameter/film thickness is calculated by using the particle diameter of the larger particle.
(*2) The number of surface particles is the number of particles in 0.001188 mm$^2$ of the resin layer surface.

Figure 7:
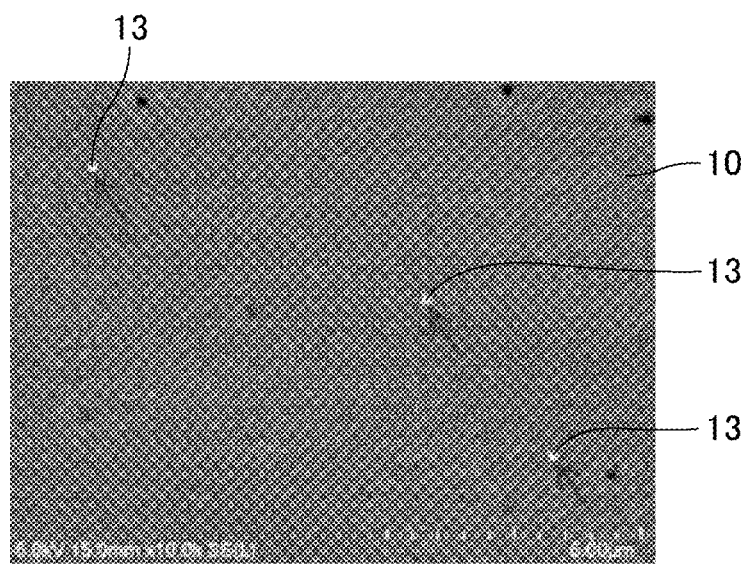
FIG. 7 is an SEM image of the surface of a film-capacitor film produced in Example 1.

FIG. 7 is an SEM image of the surface (second surface) of the film-capacitor film produced in Example 1. It is clear that there are particles 13 on the surface of the resin layer 10.

Figure 8:
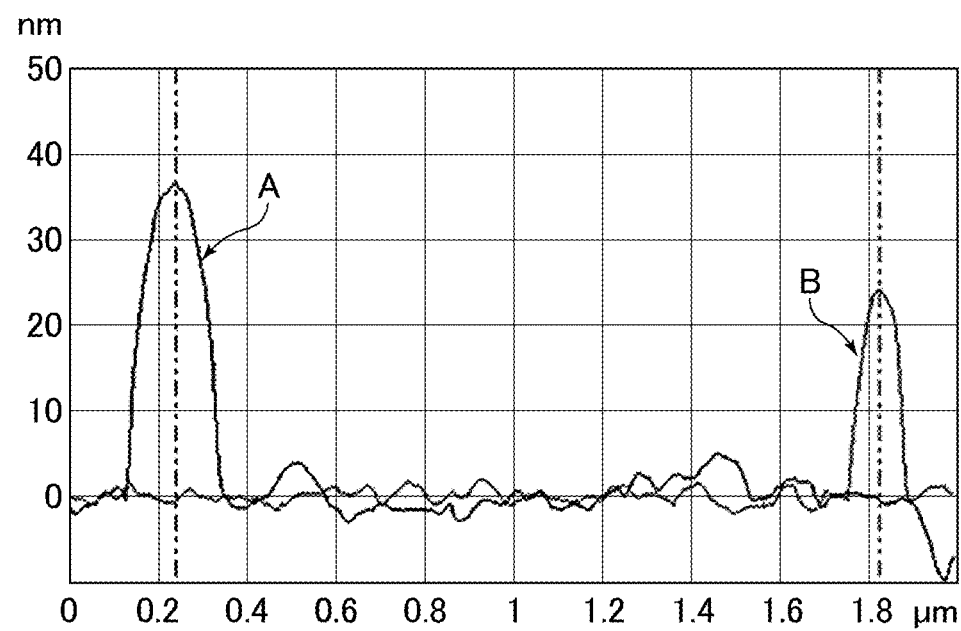
FIG. 8 is a graph illustrating the results of observing the surface of a resin layer with respect to the film-capacitor film produced in Example 1 by using a scanning probe microscope (SPM).

FIG. 8 is a graph illustrating the results of observing the surface (second surface) of the resin layer with respect to the film-capacitor film produced in Example 1 by using a scanning probe microscope (SPM). The measurement results at two places are illustrated in combination, and it is clear that the height of the particle protruding from the resin layer is about 36 nm (0.036 μm) on the left side (indicated by arrow A) and is about 22 nm (0.022 μm) on the right side (indicated by arrow B).

Regarding the film-capacitor films in Examples 1 to 5 and Comparative examples 1 and 3, silica particles having a height of 20 to 40 nm protrude from the surface of the resin layer, and presence of silica particles on the surface of the resin layer was clarified. Regarding the film-capacitor films in Examples 1 to 5, silica particles were observed even after the metal layer was formed on the surface of the resin layer on which silica particles were present. It is considered that, since the thickness of the metal layer was small, the silica particles penetrated through the electrode or an electrode did not attached around the silica particles. According to this result, it is conjectured that the particles were observed on the electrode during the measurement of the dielectric breakdown voltage.

According to comparisons between Example 1 and Comparative example 1, the dielectric breakdown voltage of Comparative example 1 was low since there were silica particles inside the resin layer. In Comparative example 2, since the size of silica particle was excessively small, all silica particles were embedded inside the resin layer, there was no silica on the surface of the resin layer, and unevenness could not be formed. Consequently, slipperiness was poor when the film-capacitor films were stacked on each other. In this state, it was difficult to work the film-capacitor film into a capacitor.

According to comparisons between Example 1 and Example 2, it was clarified that the dielectric breakdown voltage was large when the ratio of the particle diameter to the film thickness was small. Therefore, in Examples 3 and 4, the particle diameter of the particles was reduced, and the ratio of the particle diameter of the raw material particles to the film thickness was reduced. As a result, the dielectric breakdown voltage was further increased. It is conjectured that, in the case in which there is no particle inside the resin layer, the ratio of the particle diameter of the raw material particles to the film thickness is in correlation with the dielectric breakdown voltage of the film.

According to comparisons between Example 5 and Comparative example 3 in which the thermoplastic resin was used as the resin, it was clarified that the relationship between presence or absence of particles inside the resin layer and the dielectric breakdown voltage also applied to the case in which the resin was the thermoplastic resin.

REFERENCE SIGNS LIST 1, 2 film-capacitor film
10, 30 resin layer
11, 31 first surface
12 second surface
13 particle
20, 40 metal layer
51, 52 outer terminal electrode
70 base material film
71 resin-solution-coating surface
100 film capacitor
110, 111, 112, 120 metallized film

The invention claimed is:

1. A film capacitor comprising:
   a resin layer which has a first surface and a second surface and in which there are particles on at least one of the first surface and the second surface; and
   a metal layer in direct contact with the first surface of the resin layer,
   wherein there are more particles in number on the at least one of the first surface and the second surface of the resin layer than inside the resin layer, and there are no particles inside the resin layer.

2. The film capacitor according to claim 1, wherein a ratio of a diameter of the particles to a thickness of the resin layer is 0.04 to 0.13.

3. The film capacitor according to claim 1, wherein the particles are on the first surface of the resin layer, and at least some of surfaces of the particles are exposed at the metal layer.

4. The film capacitor according to claim 1, wherein an average particle diameter of the particles is 0.1 μm to 0.4 μm.

5. The film capacitor according to claim 1, wherein there are 5 to 16 particles per 0.001188 mm$^2$ of the at least one of the first surface and the second surface of the resin layer having the particles thereon.

6. The film capacitor according to claim 1, wherein a thickness of the resin layer is 1 μm to 5 μm.

7. The film capacitor according to claim 1, wherein the particles comprise inorganic particles.

8. The film capacitor according to claim 7, wherein the inorganic particles are silica particles.

9. The film capacitor according to claim 1, wherein a height of the particles protruding from the resin layer is 0.005 μm to 0.1 μm.

10. A method for manufacturing a film-capacitor film, the method comprising:
    attaching particles to a resin-solution-coating surface of a base material film;
    forming a resin layer by coating the resin-solution-coating surface of the base material film with a resin solution;
    transferring the particles from the resin-solution-coating surface of the base material film to a surface of the resin layer by peeling the resin layer off the base material film such that there are more particles in number on the surface of the resin layer than inside the resin layer, and there are no particles inside the resin layer; and
    forming a metal layer directly on the surface of the resin layer.

* * * * *